Dec. 27, 1938.  C. SCHLUMBERGER  2,141,826
METHOD AND ARRANGEMENT FOR THE ELECTRICAL SURVEY
OF THE STRATA TRAVERSED BY A BORE HOLE
Filed Aug. 31, 1935   2 Sheets-Sheet 1

Inventor:—
Conrad Schlumberger

By  Mauro & Lewis
Attorneys

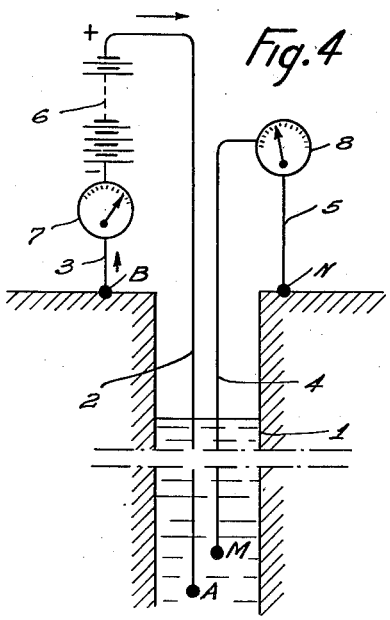
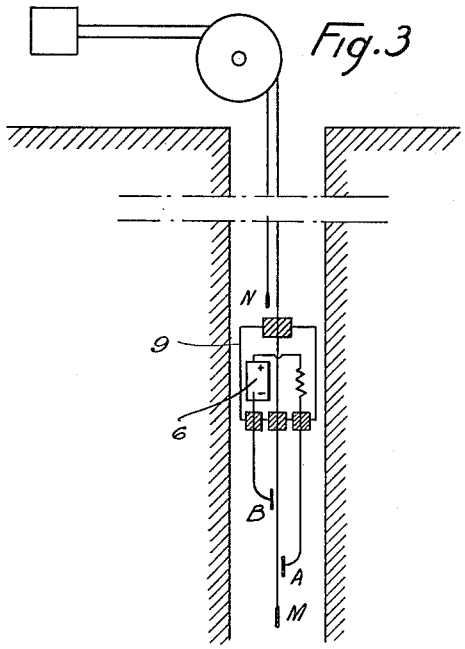
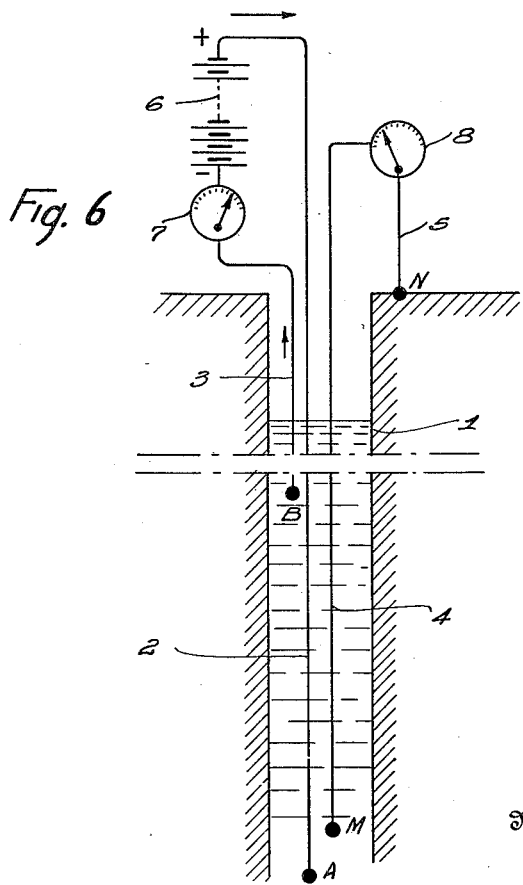
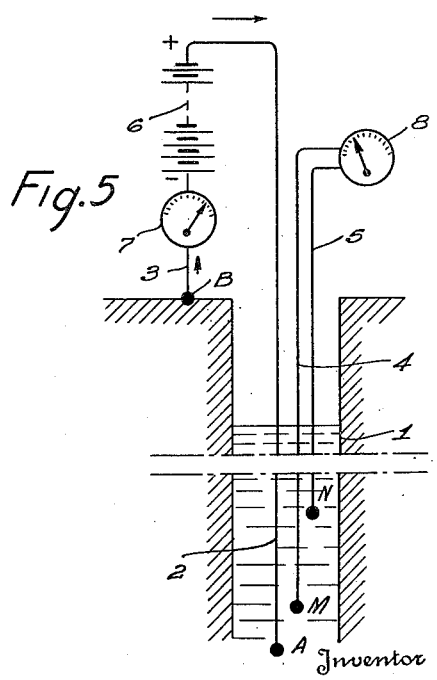

Patented Dec. 27, 1938

2,141,826

UNITED STATES PATENT OFFICE 2,141,826

METHOD AND ARRANGEMENT FOR THE ELECTRICAL SURVEY OF THE STRATA TRAVERSED BY A BORE HOLE

Conrad Schlumberger, Paris, France; Anne Marguerite Louise Doll, administratrix of said Conrad Schlumberger, deceased, assignor to Societe de Prospection Electrique, Procedes Schlumberger, Paris, France, a corporation of France Application August 31, 1935, Serial No. 38,844
In France June 4, 1935

5 Claims. (Cl. 175—182)

It is known that electrical measurements may be used to determine the nature of the various beds cut by a bore hole in the part of it which has not yet been lined with casing. The electrical resistivities of the various strata are measured successively by means of a suitable arrangement lowered to the level of these strata and suspended at the end of a cable comprising a certain number of electrical conductors insulated from each other.

In particular the operation can be carried out in accordance with the French Patent No. 678,113 of the 26th of October, 1928, or in accordance with the United States Patent No. 1,826,961 of the 7th of September, 1928. According to the latter, a four-conductor cable is used in order to lower into the bore hole, and this is the level of the rocks to be investigated, a measuring arrangement comprising four electrodes connected electrically to the four conductors of the cable and so arranged that they can have electrical contact with the ground, for instance by means of the water filling the bore hole at the level in question. By means of two of the electrodes which may conveniently be called the current supply electrodes, a current of strength $i$ is passed into the ground from a source which may be located at the surface. This current enters the ground by one of the electrodes and returns by the other. In passing through the ground, this current gives rise to potential differences due to the ohmic drop. In particular, the potential difference E which is produced in this way is measured between the two other electrodes, which may be called the measuring electrodes. Under these conditions, it is known that the resistivity of the ground in the neighbourhood of the measuring arrangement is given by the formula:

$$\rho = K \cdot \frac{E}{i}$$

in which K is a coefficient which depends solely on the geometrical dimensions of the arrangement used. If A is the electrode from which the current enters the ground, B the one by which it returns from the ground, if M and N are the electrodes between which the potential difference is measured, and if E represents the potential of M with respect to N, then;

$$K = 4\pi \frac{1}{\frac{1}{AM} - \frac{1}{AN} - \frac{1}{BM} + \frac{1}{BN}}$$

in which AM, AN, BM and BN represent the several distances of the two current supply electrodes from the two measuring electrodes.

Experience shows that there is in general a certain parasitic potential difference $e$ between the measuring electrodes, even when no current is being sent through the ground. This potential difference is due to the contact electro-motive forces between the electrodes and the water in the bore hole or the ground and to the electrical phenomena which occur spontaneously in the ground at the level of porous beds when the bore hole is filled with water. These phenomena are known under the names of electro-filtration and electro-osmosis and are described more particularly in the French Patent No. 723,592 of September 2, 1931, and in the patent of addition thereto No. 42,952 of January 11, 1933.

In the customary commercial practice the effects of these spontaneous potentials on resistivity measurements may be ignored and results may be obtained that are well within the limits of the required accuracy. In cases, however, where resistivity values are to be measured with greater accuracy, it is desirable that the parasitic spontaneous potential difference $e$ be eliminated from the potential measured by the electrodes.

Obviously at each depth a preliminary measurement could be made of the parasitic potential difference $e$, or it could be balanced by means of a potentiometer, and then the direct current would be sent through the ground by the current supply electrodes and a measurement made of the increase of the potential difference between the measuring electrodes caused by this passage of current. A method of this kind would, however, be hardly suitable for continuous recording of the potential difference E over the whole of the unlined depth of the bore hole, which is the only way in which the resistivity diagram of the strata in terms of depth can be obtained rapidly in a practical manner.

In the present stage of the technique it is possible to eliminate the influence of the parasitic spontaneous potential difference $e$ and thus conveniently make a continuous record of the potential difference E in terms of depth by passing through the current supply electrodes and into the ground a current which is periodically reversed by such means as a rotating commutator. The apparatus for measuring the potentials is then likewise periodically reversed in relation to the measuring electrodes by means of a second commutator running in synchronism with the first. Under these conditions the potential difference due to the passage of the current is always applied in the same direction to the measuring apparatus and can consequently be measured by the latter, while the parasitic spontaneous potential difference, which it is desired to eliminate, is applied to the measuring apparatus for half the time in one direction and for the other half in the other direction, so that its total effect on this apparatus is nil. If, for instance, the measuring apparatus is a millivoltmeter, the potential difference E to be measured gives rise, under these conditions, to a continuous deflection of this millivoltmeter, deflection which is proportional to E, while the parasitic spontaneous potential difference merely gives rise to a vibration of the pointer about its position of equilibrium. This vibration is usually very slight and of no consequence, provided the speed of commutation is sufficiently high. By using recording measuring apparatus and by moving the recording paper proportionally to the depth of the arrangement, the variations of the potential difference E can thus be recorded in a continuous manner in terms of the depth of the arrangement in the bore hole, and a more accurate resistivity diagram can thus be obtained.

The object of the present invention is an arrangement by which the resistivity diagram of the formations penetrated by a bore hole can be recorded continuously in terms of depth without having recourse to the reversal of the current, but on the contrary by the use of direct current.

Experience shows that the parasitic spontaneous potential difference $e$ is small in magnitude in the great majority of cases. Since the potential difference E is given by the formula:

$$E = \rho \cdot i \cdot \frac{\frac{1}{AM} - \frac{1}{AN} - \frac{1}{BM} + \frac{1}{BN}}{4}$$

it has been found, in accordance with the invention, that this potential difference can be increased, on the one hand, by increasing $i$, and, on the other hand, by selecting the dimensions of the arrangement so as to increase the factor $$\frac{1}{AM} - \frac{1}{AN} - \frac{1}{BM} + \frac{1}{BN}$$

to such an extent that the potential difference $e$ becomes relatively small in comparison to E; consequently the measured potential difference $E+e$ can then be considered to be equal to the potential difference E, which theoretically should be measured alone. It is therefore sufficient, in order to obtain the desired resistivity diagram, to send permanently into the ground, by means of the current supply electrodes A and B, a direct current $i$ of high strength relative to that heretofore used in practice (which is of the order of $\frac{1}{100}$ ampere) and to record continuously, by means of any suitable apparatus, the total direct potential difference $E+e$ between the measuring electrodes M and N, whilst the arrangement is continuously being moved inside the bore hole.

To increase the factor $$\frac{1}{AM} - \frac{1}{AN} - \frac{1}{BM} + \frac{1}{BN}$$

the inventor has ascertained experimentally that one of the most convenient methods consists in giving a relatively small value to the distance AM, of the order of the bore hole diameter for instance, and in giving comparatively high values to the other distances AN, BM and BN even to the extent of placing one or the other of the electrodes N and B at the surface, and even both of them at the same time, which would make it possible to use a cable comprising only two insulated conductors.

The accompanying drawings, without being at all limitative, illustrate the invention:

Figure 3 is a similar diagram illustrating an arrangement wherein the source of direct current is attached to the cable and lowered into the bore hole;

Figure 4 is a similar diagram illustrating an arrangement wherein two electrodes only are lowered into the bore hole, the other two electrodes being grounded at the surface;

Figures 5 and 6 are similar diagrams each showing an arrangement wherein three electrodes are lowered into the bore hole and one is grounded at the surface.

Figure 1:
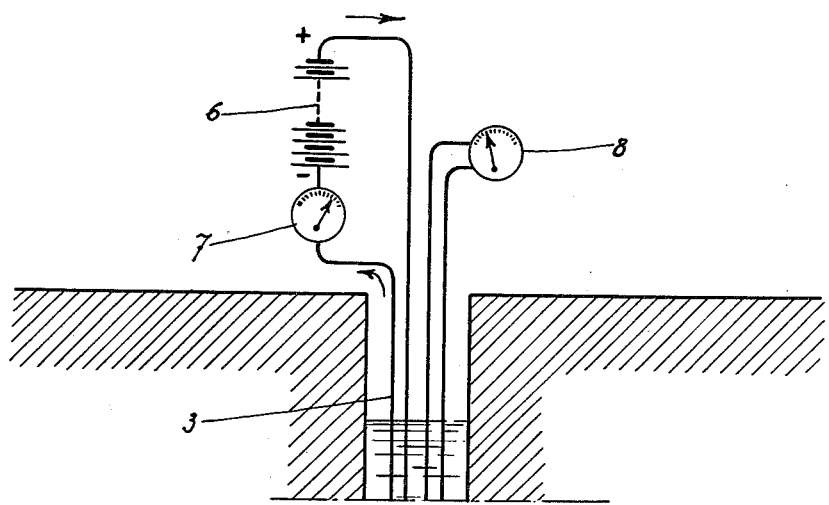
Figure 1 is an assembly diagram of an arrangement in accordance with the invention.

Figure 1 shows a bore hole 1 filled with water, in which are immersed the current supply electrodes A and B connected respectively to the insulated conductors 2 and 3 of the cable, and the measuring electrodes M and N connected respectively to the insulated conductors 4 and 5 of the cable. A source of direct current 6 is provided, which may for instance be a battery of accumulators, and 7 is an apparatus by means of which can be measured the strength of the direct current. 8 is an instrument by means of which can be measured the potential difference between the conductors 4 and 5, that is to say the potential difference between the measuring electrodes M and N to which these conductors are connected. If the potential measuring apparatus is a potentiometer, the electrical resistance of conductors 4 and 5 can be disregarded. If on the other hand the apparatus is a millivoltmeter, its internal resistance should be large in comparison with that of the conductors 4 and 5 and with the contact resistances of the electrodes M and N with the water in the bore hole. In practice the potential measuring apparatus 8 will conveniently take the form of a recording millivoltmeter, say of the photographic type, or of a recording potentiometer.

Figure 2:
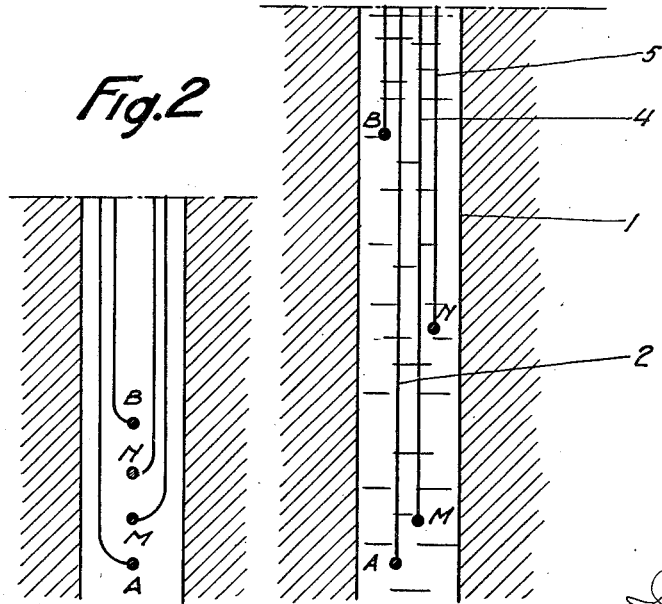
Figure 2 is a modification of the electrode arrangement shown in Fig. 1.

Moreover, the electrode arrangements referred to in this invention have the advantage of giving resistivity measurements which are very local, that is to say which concern almost exclusively the formations located in the immediate neighbourhood of the electrodes A and M in the case of Figure 1, or A, M, N and B in the case of Figure 2, and this makes it possible to obtain a very detailed chart of the formation section.

The use of direct current of high strength is likewise possible when the source of current, which may be for instance a battery of accumulators, is attached to the end of the cable in proximity to the electrodes and is lowered into the bore hole at the same time as the latter. This arrangement is illustrated in Fig. 3, wherein the direct-current source 6 is enclosed in a water tight housing 9 which is carried at the end of the cable. As there shown the two current supply electrodes are directly connected to the source of current by fairly short leads. In any of the described arrangements the cable itself may comprise only two insulated conductors connected to the two measuring electrodes, or even one insulated conductor only, if one of the measuring electrodes is placed at the surface of the ground, as shown in Figs. 5 and 6. The arrangement shown in Fig. 3 has the same advantages as that of using a source of current at the surface of the ground and in addition allows the use of a cable with a smaller number of insulated conductors.

Fig. 4 shows an arrangement in which one electrode, B, of the current supply circuit is grounded at the surface and likewise one electrode, N, of the supply circuit.

Fig. 5 shows an arrangement in which electrode B of the supply circuit is grounded at the surface, the other three electrodes being lowered into the bore hole.

Fig. 6 shows an arrangement in which electrode N of the measuring circuit is grounded at the surface, electrodes A, B being lowered into the bore hole.

I claim:

1. The method of electrical survey of the strata penetrated by a bore hole, in the part thereof not yet lined with casing but filled with water, which comprises the steps of continuously passing a direct current of known value and of high strength at various depths in the ground between a point in the bore hole at the level of the formation to be investigated, and a point in the space comprising the bore hole and the surrounding rocks, of measuring the potential difference between a point located in the bore hole near the first point at which the current is supplied and a point in the space comprising the bore hole and the surrounding rocks, and of deducing from the measurement and the value of the current the resistivity of the formation to be investigated, the current being of sufficiently high value for the potential difference produced by it between the points of measurement to be always large in comparison with the spontaneous potential difference existing between the said points.

2. The method of electrical survey of the strata penetrated by a bore hole in the part thereof not yet lined with casing but filled with water, which comprises the steps of continuously passing a direct current of known value and of high strength at various depths in the ground between a point in the bore hole at the level of the formation to be investigated, and another point in the space comprising the bore hole and the surrounding rocks, of measuring the potential difference between a point located in the bore hole near the first point at which the current is supplied and a point in the space comprising the bore hole and the surrounding rocks, and of deducing from the measurement and the value of the current the resistivity of the formation to be investigated, the current being of sufficiently high value and the distance between the first point at which the current is supplied and the first measuring point being sufficiently small for the potential difference produced by the said current between the points of measurement to be always large in comparison with the spontaneous potential difference existing between the said points.

3. An arrangement for the electrical survey of the strata penetrated by a bore hole, in the part thereof not yet lined with casing but filled with water, comprising four electrodes to be immersed in the water of the bore hole at the level of the formations to be investigated, means for varying the depth of the said electrodes in the bore hole, a source of direct current of high strength, means for making electrical connections between two of the electrodes and the source of current, means for measuring potential differences and means for making electrical connections between the other two electrodes and the said measuring means, at least one of the electrodes connected to the source of current being located at a relatively short distance from one of the electrodes connected to the measuring means.

4. An arrangement for the electrical survey of the strata penetrated by a bore hole, in the part thereof not yet lined with casing but filled with water, comprising three electrodes to be immersed in the water of the bore hole at the level of the formations to be investigated, means for varying the depth of the said electrodes in the bore hole, an electrode located at the surface of the ground, a source of direct current of high strength, means for making electrical connections between the source of current and respectively one of the electrodes in the bore hole and the electrode at the surface of the ground, means for measuring potential differences, and means for making electrical connections between the other two electrodes and the said measuring means, the electrode in the bore hole connected to the source of current being located at a relatively short distance from one of the electrodes connected to the measuring means.

5. An arrangement for the electrical survey of the strata penetrated by a bore hole, in the part thereof not yet lined with casing but filled with water, comprising four electrodes immersed in the water of the bore hole at the level of the formations to be investigated, a source of direct current of high strength placed in the bore hole in proximity to the electrodes, means for varying the depth of the electrodes and the source of current in the bore hole, means for making electrical connections between two of the electrodes and the source of current, means for measuring potential differences, and means for making electrical connections between the other two electrodes and the measuring means, at least one of the electrodes connected to the source of current being located at a relatively short distance from one of the electrodes connected to the measuring means.

CONRAD SCHLUMBERGER.